US008635318B1

(12) United States Patent
Shankar et al.

(10) Patent No.: US 8,635,318 B1
(45) Date of Patent: Jan. 21, 2014

(54) MESSAGE BROADCAST PROTOCOL WHICH HANDLES CONFIGURATION CHANGES IN A CLUSTER OF VIRTUAL SERVERS

(75) Inventors: Indumathi Shankar, Los Altos, CA (US); Avanish Mishra, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 1163 days.

(21) Appl. No.: 12/560,209

(22) Filed: Sep. 15, 2009

(51) Int. Cl.
*G06F 15/16* (2006.01)
*G06F 15/173* (2006.01)

(52) U.S. Cl.
USPC .......................................... 709/223; 709/205

(58) Field of Classification Search
USPC ................. 709/204–205, 208–211, 223–226; 714/4.1–4.3
See application file for complete search history.

(56) References Cited

U.S. PATENT DOCUMENTS

| 6,748,429 | B1 | 6/2004 | Talluri |
| 6,862,613 | B1 | 3/2005 | Kumar |
| 6,952,766 | B2 * | 10/2005 | Dervin et al. ..................... 713/2 |
| 6,959,323 | B1 | 10/2005 | Tzeng |
| 6,990,608 | B2 | 1/2006 | Wisler |
| 7,466,810 | B1 * | 12/2008 | Quon et al. ............... 379/201.01 |
| 7,490,089 | B1 * | 2/2009 | Georgiev .............................. 1/1 |
| 7,904,752 | B2 * | 3/2011 | Hood et al. ........................ 714/16 |
| 7,941,510 | B1 * | 5/2011 | Tormasov et al. ............. 709/220 |
| 8,006,134 | B2 * | 8/2011 | Nammatsu et al. .............. 714/26 |
| 2007/0195810 | A1 | 8/2007 | Fachan |
| 2010/0058108 | A1 * | 3/2010 | Nammatsu et al. ................ 714/4 |
| 2010/0186020 | A1 * | 7/2010 | Maddhirala et al. ........... 718/105 |
| 2012/0117417 | A1 * | 5/2012 | Graham et al. .............. 714/4.12 |

OTHER PUBLICATIONS

"Fast Broadcast in High Speed Networks", Gopal et al., IEEE/ACM Transactions on Networking (TON), vol. 7 , Issue 2 (Apr. 1999), pp. 262-275.

* cited by examiner

*Primary Examiner* — Brendan Higa
(74) *Attorney, Agent, or Firm* — Meyertons, Hood, Kivlin, Kowert & Goetzel, P.C.

(57) ABSTRACT

A cluster of virtual servers includes a plurality of physical nodes, where each physical node executes virtualization software which implements a virtualization environment in which one or more virtual server machines execute. The virtualization software executed by each physical node may enable the virtualization environment implemented by the physical node to be dynamically changed. Some types of configuration changes to the virtualization environment may take a significant amount of time to perform, e.g., several seconds or longer. While the configuration change is taking place, the physical node may be unable to respond to messages sent by other physical nodes in the cluster of virtual servers. The nodes may execute message broadcast software which implements a message broadcast protocol which takes into account the dynamic configuration changes to the virtualization environments of the nodes in the cluster of virtual servers so that these periods of unresponsiveness can be handled gracefully.

20 Claims, 6 Drawing Sheets

MESSAGE BROADCAST PROTOCOL WHICH HANDLES CONFIGURATION CHANGES IN A CLUSTER OF VIRTUAL SERVERS

BACKGROUND OF THE INVENTION

1. Field of the Invention

This invention relates to cluster environments in which a plurality of server computers cooperate to perform a distributed application. More particularly, the invention relates to a message broadcast protocol used by a cluster of virtual servers.

2. Description of the Related Art

A server cluster is a group of linked server computers that cooperate closely to perform a particular application. Clusters are usually deployed to improve performance and/or availability over that provided by a single server computer. In order to cooperate to perform their intended function, the servers in the cluster need to exchange messages with each other using a message broadcast protocol.

The use of virtualization technology is becoming increasingly common in server clusters. A virtual machine (VM), also referred to as a virtual computer, is a software implementation of a machine (computer) that executes programs like a real machine. Virtualization provides the ability for multiple virtual machines to run together on the same physical computer. Each virtual machine may execute its own operating system and may appear to a user of the virtual machine to be the same as an independent physical computer. The software layer that executes on the physical computer to create and manage the virtual machines is referred to herein as virtualization software.

Virtualization may be used in a computer server cluster to make more efficient use of the physical resources of the physical computers (nodes) in the cluster. Clusters may be virtualized so that multiple virtual servers execute on each physical node in the cluster, e.g., where each virtual server is implemented as a virtual machine. By implementing cluster virtualization, organizations are able to consolidate the application workload of multiple servers onto a smaller number of physical nodes, which results in improved hardware utilization, fewer physical nodes, cost savings, and simplified deployment and management.

In addition to these benefits, the virtualization software which implements the virtual servers may also enable greater flexibility in the configuration of the cluster environment beyond what is possible in non-virtualized server clusters. For example, a virtual server may be dynamically migrated from one physical node of the cluster to another. As another example, the number of virtual CPUs assigned to a particular physical node may be dynamically changed.

These types of dynamic changes in the configuration of the virtualized server cluster are problematic for conventional message broadcast protocols designed to be used in non-virtualized server clusters. When the virtualization environment of a particular node is dynamically changed, the node may be temporarily unable to receive and/or respond to messages broadcast by other nodes in the cluster during the configuration change. This may cause a slowdown in the operation of the other nodes while they wait for the node undergoing the configuration change to respond. It may also cause the other nodes to mistakenly assume that the node undergoing the configuration change has failed and is no longer a member of the cluster.

SUMMARY

Various embodiments of a cluster of virtual servers are described herein. The cluster of virtual servers may include a plurality of physical nodes, where each node executes virtualization software which implements a virtualization environment in which one or more virtual server machines execute. A first node of the cluster of virtual servers may be configured to register to receive notifications of one or more types of configuration changes in the virtualization environment of the first node, where each respective type of configuration change prevents the first node from responding to broadcast messages sent by other nodes of the cluster of virtual servers during the respective type of configuration change. The first node may be further configured to receive a first notification indicating that a first type of configuration change in the virtualization environment of the first node has been initiated after registering to receive the notifications. In response to the first notification, the first node may transmit a first message to one or more other nodes of the cluster of virtual servers to inform the one or more other nodes that the first node is in a temporarily inactive state in which the first node is unable to respond to broadcast messages sent by other nodes of the cluster of virtual servers. The one or more other nodes of the cluster of virtual servers may be configured to store information indicating that the first node is in the temporarily inactive state in response to receiving the first message.

According to a further embodiment, the first node of the cluster of virtual servers may also be configured to determine a particular amount of time which the first type of configuration change in the virtualization environment of the first node is expected to take to complete. The first message transmitted to the one or more other nodes of the cluster of virtual servers may include the particular amount of time and may inform the one or more other nodes that the first node is expected to be in the temporarily inactive state for the particular amount of time.

The cluster of virtual servers may also include an additional node configured to broadcast heartbeat messages to other nodes of the cluster of virtual servers to determine whether the other nodes are currently active. The additional node may be configured to receive the first message indicating that the first node is expected to be in the temporarily inactive state for the particular amount of time, and increase a heartbeat timeout for the first node from a default value to a new value based on the particular amount of time in response to receiving the first message.

The cluster of virtual servers may also include an additional node configured to receive the first message indicating that the first node is in the temporarily inactive state. After receiving the first message, the additional node may initiate a multi-phase commit protocol by broadcasting a query message to each of the other nodes of the cluster of virtual servers requesting them to reply indicating whether they can commit a particular operation. The additional node may receive a reply to the query message from each node of the cluster of virtual servers except the first node affirming ability to commit the particular operation. In response to determining that the first node is in the temporarily inactive state, the additional node may determine that the particular operation should be committed by each of the other nodes of the cluster of virtual servers except the first node without waiting for a reply to the query message from the first node. The additional node may broadcast a commit message requesting each of the other nodes of the cluster of virtual servers except the first node to commit the particular operation. In some embodiments the additional node may set a response timeout for the first node to a particular value in response to receiving the first message indicating that the first node is in the temporarily inactive state. Determining that the particular operation should be committed by each of the other nodes of the cluster of virtual servers except the first node without waiting for a reply to the query message from the first node may include determining that the response timeout for the first node has expired since the time when the query message was broadcast.

The first node of the cluster of virtual servers may be further configured to receive a second notification indicating that the first type of configuration change in the virtualization environment of the first node has been completed, and transmit an additional message to the one or more other nodes of the cluster of virtual servers to inform the one or more other nodes that the first node has returned to a normal state in which the first node is able to respond to broadcast messages sent by other nodes of the cluster of virtual servers. A particular node of the one or more other nodes may receive the additional message transmitted from the first node indicating that the first node has returned to the normal state, and in response to the additional message, may determine that one or more operations were committed by each of the nodes of the cluster of virtual servers except the first node while the first node was in the temporarily inactive state. The particular node may transmit one or more messages to the first node requesting the first node to commit the one or more operations.

BRIEF DESCRIPTION OF THE DRAWINGS

A better understanding of the invention can be obtained when the following detailed description is considered in conjunction with the following drawings, in which.

Figure 1:
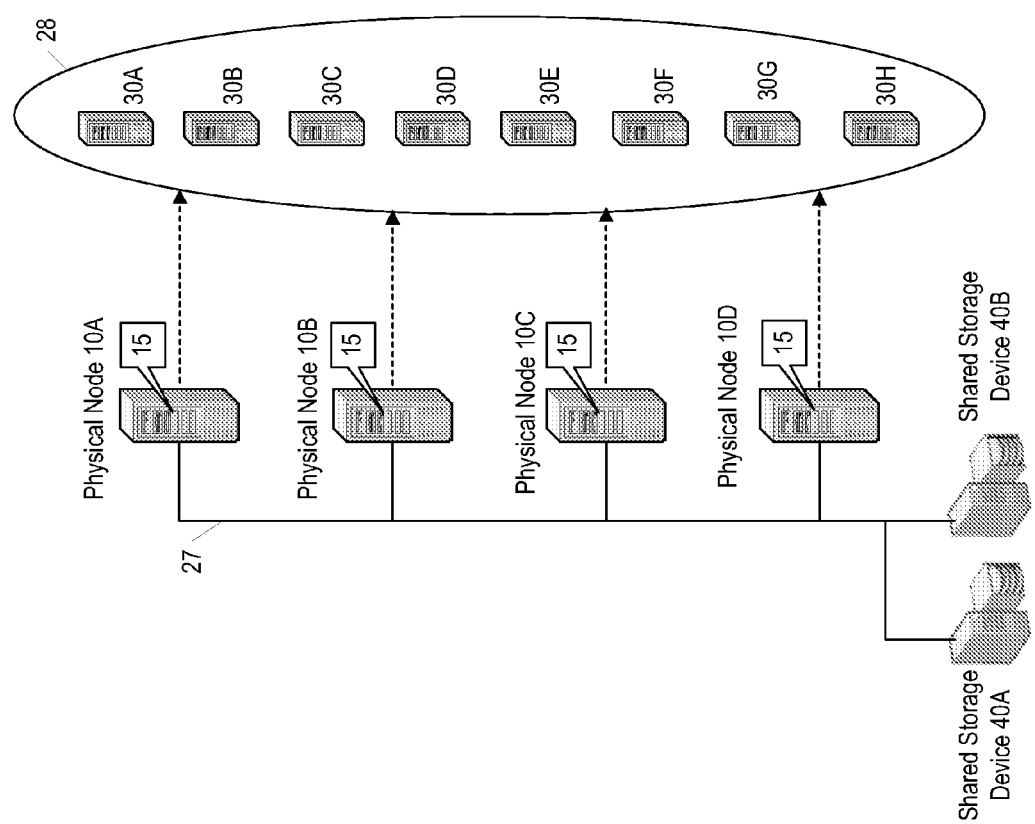
FIG. 1 illustrates an example of a cluster of virtual servers according to one embodiment.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a cluster of virtual servers are described herein. As used herein, the term "cluster of virtual servers" refers to a system which includes a plurality of physical nodes or computers, where each physical node executes virtualization software which implements a virtualization environment in which one or more virtual server machines execute. A virtual server machine is a server machine or server computer which is implemented as a virtual machine, e.g., as opposed to a physical server machine.

The physical nodes of the cluster of virtual servers may be configured to perform a message broadcast protocol. For example, the message broadcast protocol may be used to coordinate atomic transactions involving multiple physical nodes (or involving virtual server machines which execute on multiple physical nodes). For example, in response to a request to perform a particular operation, it may be desirable to ensure that either all of the physical nodes in the cluster commit the operation, or none of them do. The message broadcast protocol may be used to exchange messages among the physical nodes to ensure that the operation is committed atomically by the nodes. In some embodiments the message broadcast protocol may also be used to exchange heartbeat messages or other messages to identify which physical nodes are currently active as members of the cluster of virtual servers.

The virtualization software executed by each physical node may enable the virtualization environment implemented by the physical node to be dynamically changed in various ways. Some types of configuration changes to the virtualization environment may take a significant amount of time to perform, e.g., several seconds or longer. While the configuration change is taking place, the physical node may be unable to respond to messages sent by other physical nodes in the cluster of virtual servers. As described in detail below, the message broadcast software which implements the message broadcast protocol may take into account the dynamic configuration changes to the virtualization environments of the nodes in the cluster of virtual servers so that these periods of unresponsiveness can be handled gracefully, e.g., without causing operations performed by the other nodes of the cluster of virtual servers to fail, without causing the operations performed by the other nodes to be unacceptably slowed down, and/or without causing the node undergoing the configuration change to be ejected from membership in the cluster of virtual servers.

Referring now to FIG. 1, an example of the cluster of virtual servers according to one embodiment is illustrated. In this example the cluster of virtual servers includes four physical nodes or computers 10A-10D. (Unless otherwise specified, the term "node" is used herein to refer to a physical node of the cluster of virtual servers.) In other embodiments the cluster of virtual servers may include various other numbers of physical nodes 10 (as long as there are at least two). Each node 10 may execute virtualization software which implements a virtualization environment in which one or more virtual server machines 30 execute. The virtualization software on a particular node 10 may instantiate multiple virtual machines within the virtualization environment on the particular node 10, where each virtual machine acts as a server computer (referred to as a virtual server machine 30). For example, the particular node 10 may execute multiple operating systems, where each operating system corresponds to one of the virtual server machines 30 implemented on the particular node 10.

FIG. 1 illustrates a resource pool 28 which includes virtual server machines 30A-30H. Each of the virtual server machines 30 of the resource pool 28 executes on one of the physical nodes 10. As one example, the virtual server machines 30A and 30B may execute on the node 10A, the virtual server machines 30C and 30D may execute on the node 10B, the virtual server machines 30E and 30F may execute on the node 10C, and the virtual server machines 30G and 30H may execute on the node 10D. In various embodiments there may be any number of virtual server machines 30 in the resource pool 28, and the virtual server machines 30 may be distributed among the physical nodes 10 in any of various other ways. Also, each physical node 10 may execute any number of virtual server machines 30. In various embodiments the virtual server machines 30 may be used to perform any of various types of distributed applications. As one example, the virtual server machines 30 may execute file system software which implements a distributed file system.

The physical nodes 10 of the cluster of virtual servers may be coupled to each other through a network 27. In some embodiments the nodes 10 may be coupled through a local area network (LAN). In other embodiments, the nodes 10 may be coupled through any of various other types of networks or combinations of networks. For example, the network 27 may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each node 10 may be coupled to the network 27 using any type of wired or wireless connection medium. For example, wired mediums may include Ethernet, fiber channel, etc. Wireless connection mediums may include a satellite link, a modem link through a cellular service, a wireless link using a wireless communication protocol such as IEEE 802.11 (wireless Ethernet), etc.

In the illustrated embodiment the nodes 10 also couple through the network 27 (or through another network) to shared storage devices 40A and 40B. In various embodiments there may be any number of shared storage devices 40, and each shared storage device 40 may be any type of storage device configured to store data. For example, a shared storage device 40 may be a tape drive (e.g., a device operable to store data on tape cartridges), a disk storage unit (e.g., a device including one or more disk drives), an optical storage device (e.g., a device operable to store data on optical media), a flash memory storage device, etc. In some embodiments the shared storage devices 40 may be network-attached storage (NAS) devices. In other embodiments the shared storage devices 40 may be storage area network (SAN) devices.

As illustrated in FIG. 1, each node 10 may execute message broadcast software 15. The message broadcast software 15 may implement the message broadcast protocol which enables the nodes 10 to exchange messages and gracefully handles dynamic configuration changes in the virtualization environments on the nodes 10.

Figure 2:
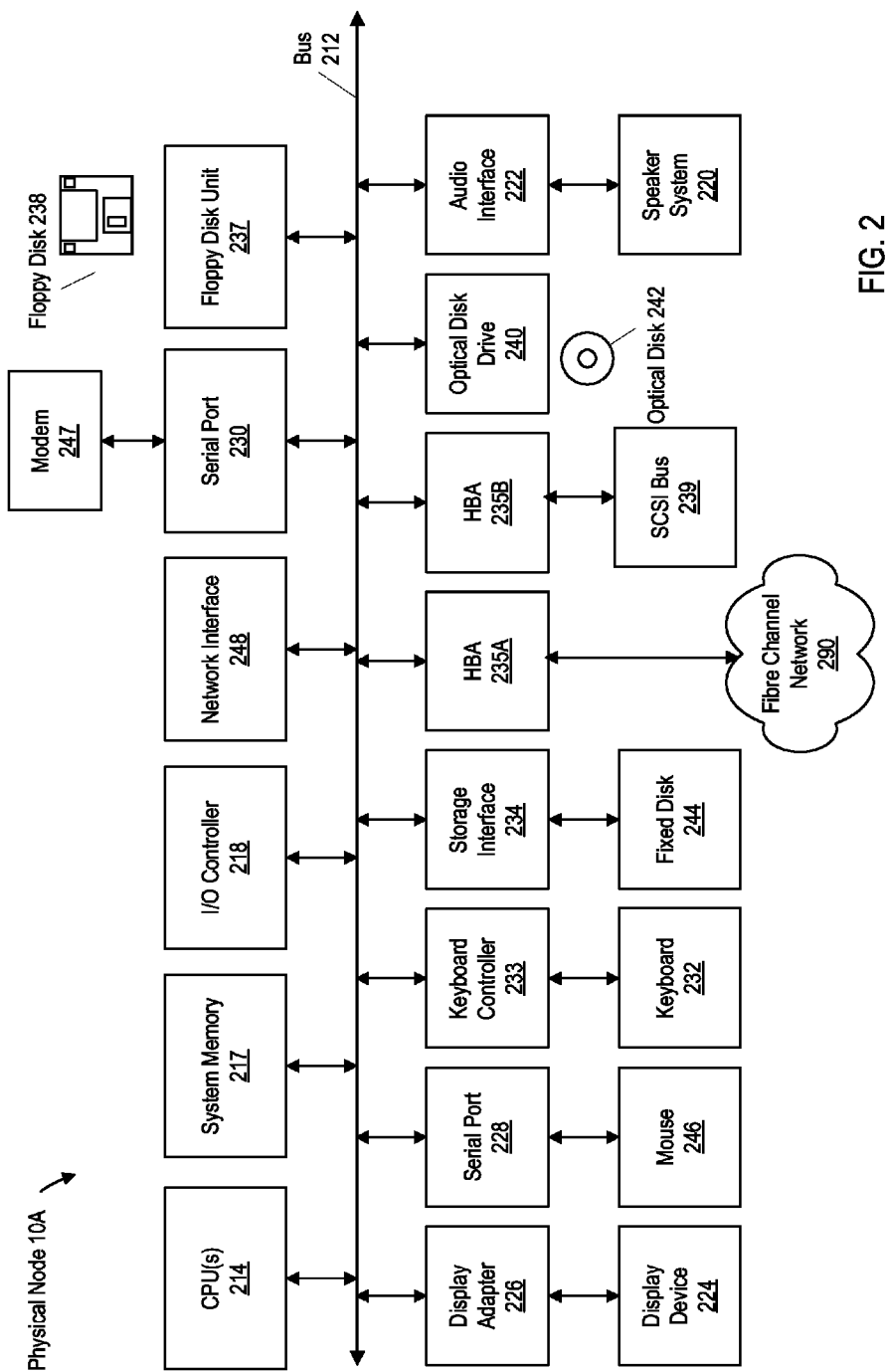
FIG. 2 is a diagram illustrating an example of a physical node of the cluster of virtual servers.

FIG. 2 is a diagram illustrating an example of a physical node 10 in detail according to one embodiment. In general, each physical node 10 may be any type of physical computer or computing device, and FIG. 2 is given as an example only. In the illustrated embodiment, the node 10 includes a bus 212 which interconnects major subsystems or components of the node 10, such as one or more central processor units 214, system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor(s) 214 and system memory 217, which may include read-only memory (ROM) or flash memory (neither shown), and random access memory (RAM) (not shown), as previously noted. The RAM is generally the main memory into which software programs are loaded, including the message broadcast software 15. The ROM or flash memory can contain, among other code, the Basic Input-Output system (BIOS) which controls basic hardware operation such as the interaction with peripheral components. Software resident with the node 10 is generally stored on and accessed via a computer-readable medium, such as a hard disk drive (e.g., fixed disk 244), an optical drive (e.g., optical drive 240), a floppy disk unit 237, or other storage medium. Additionally, software can be received through the network modem 247 or network interface 248.

The storage interface 234, as with the other storage interfaces of the node 10, can connect to a standard computer-readable medium for storage and/or retrieval of information, such as a fixed disk drive 244. The message broadcast software 15 and other software executing on the node 10 may store information on the disk drive 244. In some embodiments the message broadcast software 15 and other software executing on the node 10 may also, or may alternatively, store information on a shared storage device 40. In some embodiments the shared storage device 40 may be coupled to the node 10 through the fibre channel network 290. In other embodiments the shared storage device 40 may be coupled to the node 10 through any of various other types of storage interfaces or networks.

Many other devices or subsystems (not shown) may be connected in a similar manner. Conversely, all of the devices shown in FIG. 2 need not be present to practice the present disclosure. The devices and subsystems can be interconnected in different ways from that shown in FIG. 2. Code to implement the message broadcast protocol described herein may be stored in computer-readable storage media such as one or more of system memory 217, fixed disk 244, optical disk 242, or floppy disk 238. The operating system provided on the node 10 may be a Microsoft Windows® operating system, UNIX® operating system, Linux® operating system, or another operating system.

Figure 3:
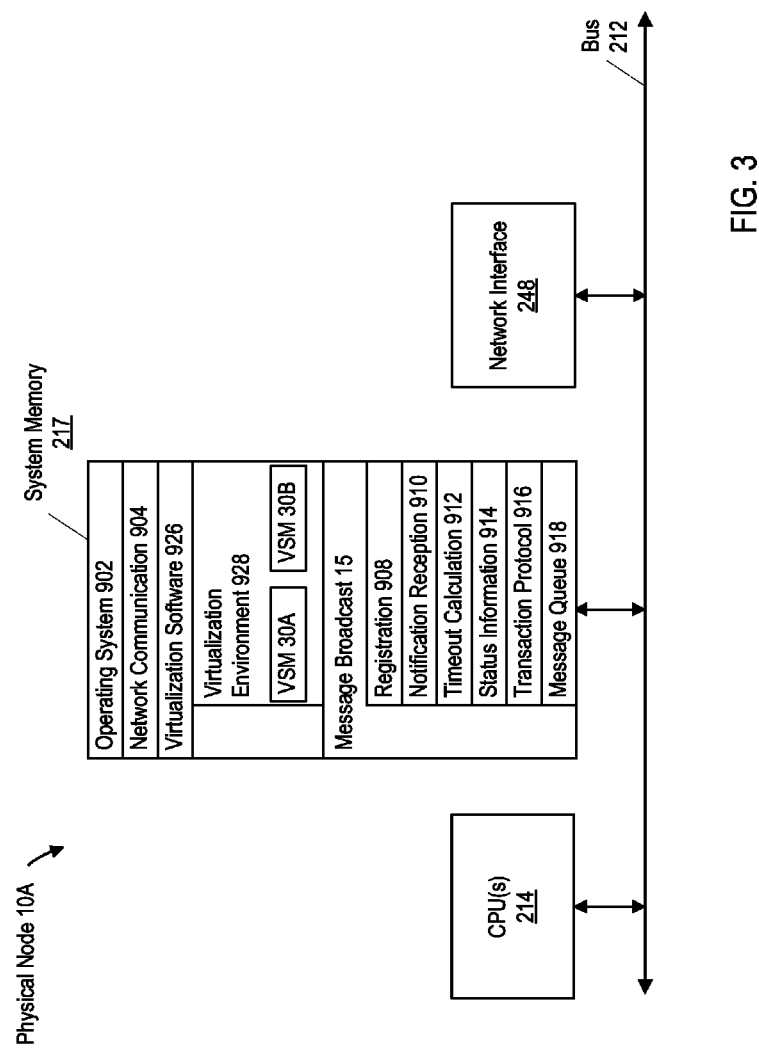
FIG. 3 illustrates various software modules stored in the system memory of the physical node.

FIG. 3 illustrates various software modules stored in the system memory 217 of a given physical node 10 of the cluster of virtual servers. The program instructions of the software modules are executable by the one or more processors of the given physical node 10. The software modules illustrated in FIG. 3 are given as one example of a software architecture which implements various features described herein. In other embodiments, other software architectures may be used.

In the illustrated embodiment the software of the node 10 includes virtualization software 926. The virtualization software 926 implements a virtualization environment 928 in which one or more virtual server machines 30 execute (e.g., the virtual server machines 30A and 30B in the illustrated example). The software of the node 10 also includes an operating system 902. (It is noted that the virtualization software 926 may also execute other operating systems which are used by the respective virtual server machines 30 of the virtualization environment 928. The operating system 902 of the physical node 10 may be separate from the operating systems of the virtual server machines 30.) The software of the node 10 also includes the message broadcast software 15. The message broadcast software 15 includes various modules such as a registration module 908, a notification reception module 910, a timeout calculation module 912, a status information module 914, a transaction protocol module 916, and a message queue module 918. The functions performed by the various modules of the message broadcast software 15 are described below. The software of the node 10 also includes a network communication module 904. The network communication module 904 may be used by the message broadcast software 15 to transmit messages to other nodes 10 in the cluster of virtual servers.

Thus, each node 10 of the cluster of virtual servers may execute a respective instance of the message broadcast software 15. The various instances of the message broadcast software 15 may communicate with each other to allow the nodes to exchange messages and to handle dynamic configuration changes that occur in the virtualization environments 928 of the nodes 10.

Figure 4:
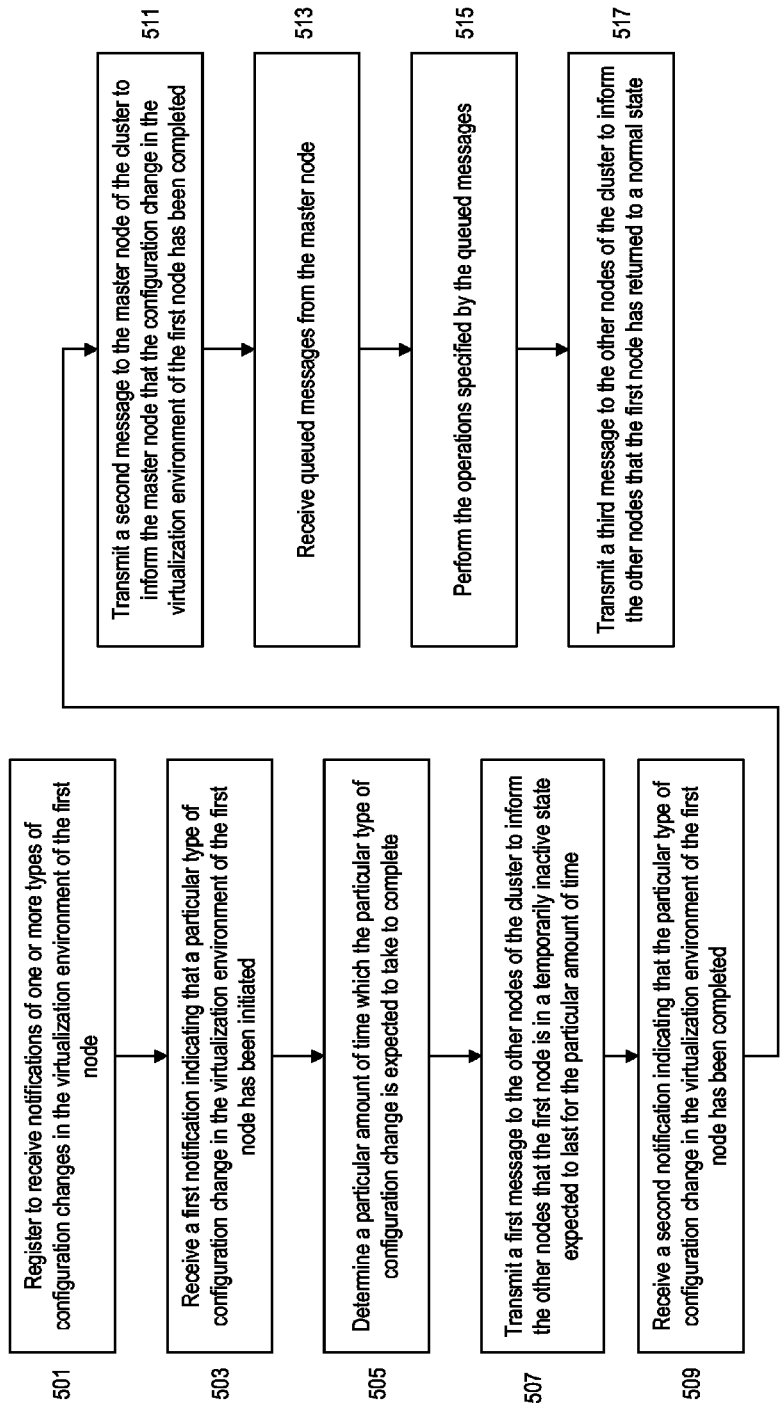
FIG. 4 is a flowchart diagram illustrating the operation of a particular instance of message broadcast software executing on a particular node of the cluster of virtual servers, where the virtualization environment on the particular node undergoes a configuration change which renders the particular node temporarily unable to communicate with other nodes of the cluster of virtual servers.

FIG. 4 is a flowchart diagram illustrating the operation of a particular instance of the message broadcast software 15 executing on a particular node 10 of the cluster of virtual servers, where the virtualization environment 928 on the particular node 10 undergoes a configuration change which renders the particular node 10 temporarily unable to communicate with other nodes 10 of the cluster of virtual servers. For convenience, the particular node 10 which undergoes the configuration change is referred to as the "first node".

In block 501, the registration module 908 of the message broadcast software 15 executing on the first node may register to receive notifications of one or more types of configuration changes in the virtualization environment 928 of the first node. For example, the registration module 908 may use an application programming interface (API) of the operating system 902 or the virtualization software 926 to request to be programmatically notified when various types of configuration changes to the virtualization environment 928 occur. In particular, the registration module 908 may request to receive notifications of configuration changes to the virtualization environment 928 which take a significant amount of time (e.g., several seconds or more) to complete, and which render the first node temporarily unable to communicate with other nodes 10 of the cluster of virtual servers and/or temporarily unable to commit operations requested by other nodes 10 of the cluster of virtual servers.

In various embodiments, the virtualization software 926 may be able to re-configure the virtualization environment 928 of the first node in various ways. As one example, a particular virtual server machine 30 executing within the virtualization environment 928 of the first node may be dynamically migrated to another node 10 of the cluster of virtual servers, or a particular virtual server machine 30 may be dynamically migrated from another node 10 to the virtualization environment 928 of the first node. For example, virtualization software from Sun Microsystems, Inc. supports the dynamic migration of logical domains (LDOMs) between physical nodes, e.g., where an LDOM corresponds to a particular virtual server machine 30. As another example, virtualization software from IBM Corp. supports the dynamic migration of micro partitions between physical nodes, e.g., where a micro partition corresponds to a particular virtual server machine 30. During the migration of a virtual server machine 30 to or from the first node, the first node may not be able to communicate with other nodes 10 of the cluster of virtual servers and/or may not be able to commit operations requested by other nodes 10 of the cluster of virtual servers. Thus, the registration module 908 may request to receive notification of when a virtual server machine migration begins on the first node so that this event can be handled by the message broadcast protocol.

As another example of a configuration change which may disrupt the first node's normal operation, the virtualization software 926 may be able to dynamically change the resources assigned to a particular virtual server machine 30 and/or re-distribute resources assigned to different virtual server machines 30. For example, in some embodiments the virtualization software 926 may create a pool of virtual CPUs. Each virtual server machine 30 may be assigned one or more of the virtual CPUs. The virtualization software 926 may be able to dynamically re-assign a virtual CPU from one virtual server machine 30 to another. As another example, the virtualization software 926 may dynamically increase or decrease an amount of RAM assigned to a particular virtual server machine 30. Thus, the registration module 908 may request to receive notification of when the virtualization software 926 begins to perform these or other types of changes to the resources allocated to the virtual server machines 30 on the first node.

As another example of a configuration change which may disrupt the first node's normal operation, the virtualization software 926 may be able to dynamically change the status of virtual or physical device drivers used in the virtualization environment 928 of the first node. The virtualization software 926 may also dynamically change resources used in the virtualization environment 928 such as network links, storage links or virtual switches. The registration module 908 may request to receive notifications of when the virtualization software 926 begins to perform these or other types of changes to the virtualization environment 928 of the first node.

Referring again to FIG. 4, subsequently to registering to receive notifications of the various types of configuration changes, in block 503 the notification reception module 910 of the message broadcast software 15 may receive a first notification indicating that a particular type of configuration change in the virtualization environment 928 of the first node has been initiated. In response to the first notification, the timeout calculation module 912 may determine a particular amount of time which the particular type of configuration change is expected to take to complete. In various embodiments the amount of time may be determined in various ways. For example, in some embodiments each type of configuration change may be expected to take a known and fixed amount of time, and the timeout calculation module 912 may simple retrieve information specifying the expected amount of time. In other embodiments the amount of time required to complete the configuration change may vary depending upon the current configuration of the virtualization environment 928 and the new configuration to which it needs to be changed. The timeout calculation module 912 may estimate the amount of time required to complete the configuration change depending upon various factors in the current or new configuration.

In block 507 the message broadcast software 15 of the first node may transmit a first message to the other nodes 10 of the cluster of virtual servers to inform the other nodes that the first node has entered a temporarily inactive state expected to last for the particular amount of time. The instances of the message broadcast software 15 executing on the other nodes 10 may receive the first message and update their status information for the first node to indicate that the first node is in the temporarily inactive state. They may then begin treating the first node differently to account for the possibility that the first node will be unresponsive to messages transmitted during the temporarily inactive state, as described below.

After the virtualization software 926 has completed the particular type of change to the virtualization environment 928 of the first node, the virtualization software 926 may notify the notification reception module 910 that the particular type of configuration change has been completed, as indicated in block 509. The message broadcast software 15 of the first node may then transmit a second message to a master node of the cluster of virtual servers to inform the master node that the configuration change in the virtualization environment of the first node has been completed, as indicated in block 513.

During the time in which the virtualization environment 928 of the first node was undergoing the configuration change, the other nodes 10 of the cluster may have continued to commit various operations which the first node would normally be expected to commit along with them. A node in the cluster may initiate a transaction to perform a particular operation by sending messages to the other nodes in the cluster, e.g., according to a multi-phase commit protocol. The messages specifying the operation to be performed may be sent to all the other nodes of the cluster, including the first node. However, since the first node is undergoing the configuration change the first node may be unable to receive or respond to the messages. The master node may keep a queue of the messages to which the first node did not respond while it was in the temporarily inactive state. Once the master node receives the second message indicating that the configuration change in the virtualization environment of the first node has been completed, the master node may transmit these queued messages to the first node. As indicated in block 513, the message broadcast software 15 of the first node may receive the queued messages from the master node. In block 515 the message broadcast software 15 of the first node may then process the received messages, e.g., by performing the specified operations. The messages may be numbered so that they are performed in a particular order, i.e., the same order in which the operations were performed by the other nodes of the cluster of virtual servers. It is possible that one or more of the messages received in block 513 may have already been processed by the first node. For example, even though the first node may have been unable to response to a particular message while it was in the inactive state, the first node may have still received and processed the messages. Any messages which have already been processed may be ignored.

After the queued messages have been processed, the first node should then be in the same state as the other nodes 10 of the cluster of virtual servers. The message broadcast software 15 of the first node may then transmit a third message to the other nodes 10 of the cluster of virtual servers to inform the other nodes 10 that the first node has returned to a normal state, as indicated in block 517. The other nodes 10 may then reset their status information for the first node to indicate that it should once again be treated normally by the message broadcast protocol.

Figure 5:
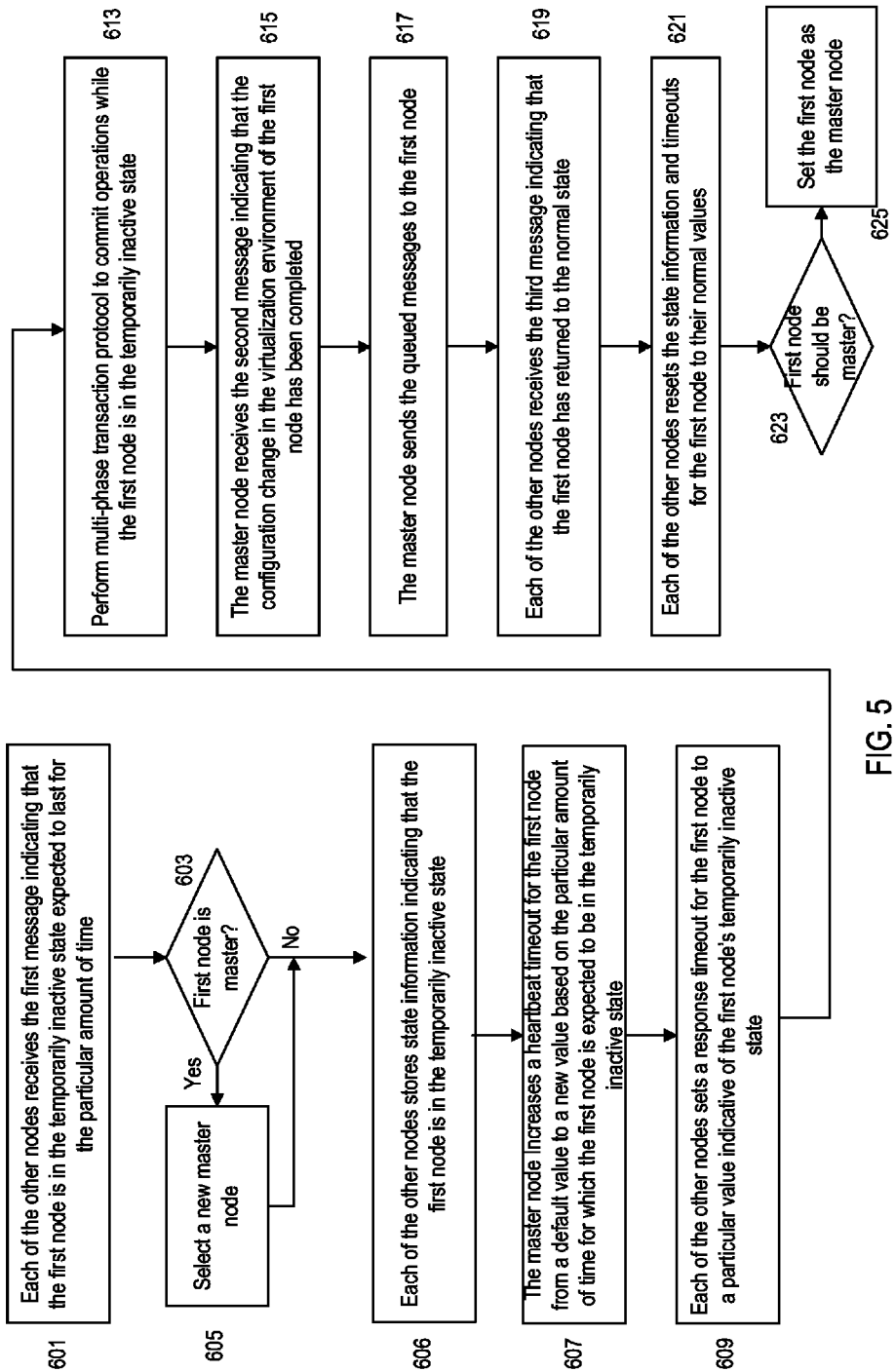
FIG. 5 is a flowchart diagram illustrating the operation of other instances of the message broadcast software on other nodes of the cluster of virtual servers.

FIG. 4 illustrates the operation of the message broadcast software 15 on the first node. FIG. 5 is a flowchart diagram illustrating the operation of the message broadcast software 15 on other nodes of the cluster of virtual servers.

In block 601 the message broadcast software 15 on each of the nodes other than the first node receives the first message transmitted by the first node indicating that the first node has entered the temporarily inactive state. It is possible that the first node is the master node. In this case, the other nodes of the cluster of virtual servers communicate to select a new node as the master node to replace the first node, as indicated in blocks 603 and 605.

In block 606 each of the other nodes in the cluster may store state information indicating that the first node is in the temporarily inactive state.

The master node may periodically broadcast heartbeat messages to the other nodes 10 of the cluster. Each of the other nodes 10 is expected to respond to the heartbeat messages within a default timeout amount of time. Since the first node is temporarily inactive, the master node increases the heartbeat timeout for the first node from the default value to a new value based on the particular amount of time for which the first node is expected to be in the temporarily inactive state, as indicated in block 607. Increasing the heartbeat timeout may prevent the first node from being removed from the cluster of virtual servers due to not replying to the heartbeat messages during the time in which the first node is in the temporarily inactive state.

In addition to the heartbeat timeout, another timeout referred to herein as a response timeout may be used in the cluster. Each of the other nodes may set the response timeout for the first node to a particular value indicative of the first node's temporarily inactive state, as indicated in block 609. As indicated in block 613, while the first node is in the temporarily inactive state, other nodes in the cluster may perform transactions for operations that need to be committed by all the nodes of the cluster of virtual servers. The transactions may be performed according to a multi-phase atomic commit protocol, such as a two-phase commit (2PC) protocol or a three-phase commit (3PC) protocol. Each transaction may be coordinated by any of the nodes in the cluster. For example, in a 2PC protocol, a coordinator node may first send a query message to each of the other nodes to determine whether they can commit the operation. Each node is expected to return a reply message of either Yes (can commit) or No (cannot commit). The coordinator node collects the responses. If all of the nodes voted Yes then the coordinator node sends another message requesting them to actually commit the transaction.

Normally the coordinator node may wait for all of the nodes to respond to the query message sent in the multi-phase atomic commit protocol. However, since the first node is temporarily inactive and may not be able to response, the response timeout is used to prevent the coordinator node from waiting for a reply from the first node for longer than the response timeout.

In block 615 the master node receives the second message indicating that the configuration change in the virtualization environment of the first node has been completed. The master node may then send the first node any queued messages for operations that were performed while the first node was undergoing the configuration change, as described above. After the first node has received and processed the messages, it sends the third message indicating that the first node has returned to the normal state. Each of the other nodes of the cluster receives the third message, as shown in block 619. They then reset the state information for the first node to indicate that the first node has returned to the normal state, and may reset the heartbeat timeout and the response timeout for the first node to their normal values, as indicated in block 621.

If the first node was originally the master node then the current master node may communicate with the other nodes of the cluster of virtual servers to reset the first node as the master node, as shown in blocks 623 and 625.

Figure 6:
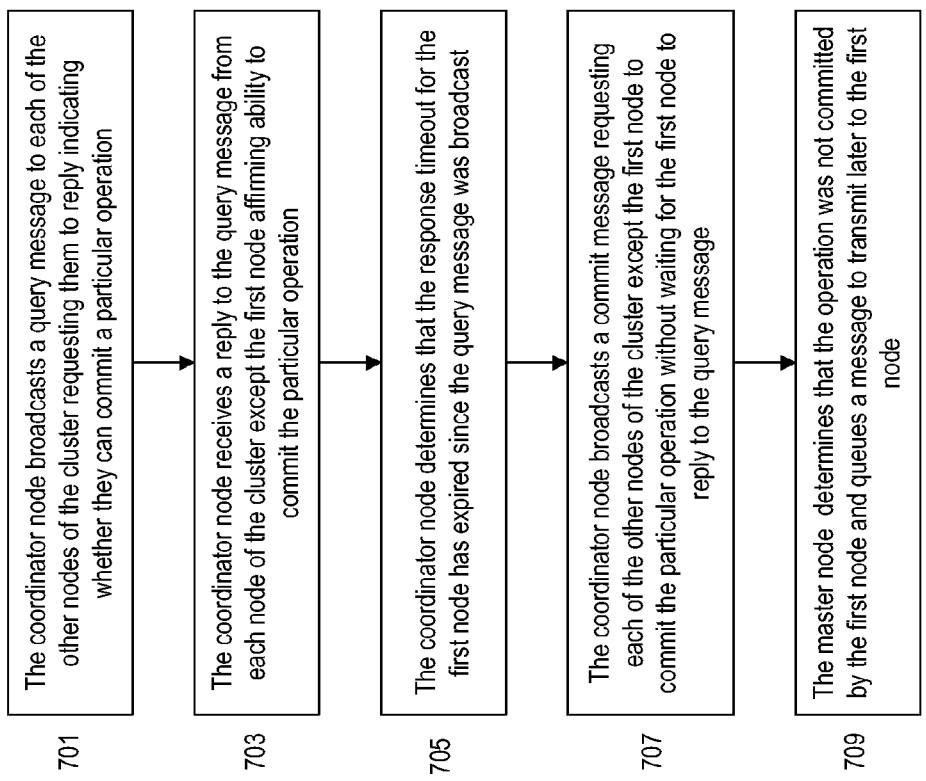
FIG. 6 is a flowchart diagram illustrating one embodiment of a method performed by a node to coordinate transactions for operations that need to be committed by all the nodes of the cluster of virtual servers.

FIG. 6 is a flowchart diagram illustrating block 613 of FIG. 5 in more detail. In block 701 a coordinator node which coordinates a particular transaction broadcasts a query message to each of the other nodes 10 of the cluster of virtual servers requesting them to reply indicating whether they can commit a particular operation. The query message may be broadcast to the first node as well as the other nodes of the cluster of virtual servers. In block 703 the coordinator node receives a reply to the query message from each node 10 of the cluster of virtual servers except the first node affirming ability to commit the particular operation. In block 705 the coordinator node determines that the response timeout for the first node has expired since the time when the query message was broadcast. In block 707 the coordinator node broadcasts a commit message requesting each of the other nodes of the cluster of virtual servers except the first node to commit the particular operation without waiting for the first node to reply to the query message.

In block 709 the master node determines that the operation was not committed by the first node and queues a message to transmit later to the first node, where the queued message specifies the operation that was committed by the other nodes. The queued message will be transmitted from the master node to the first node after it has completed its configuration change so that it can perform the operation to synchronize itself with the other nodes.

It is possible that the master node can fail before the message queue is sent to the first node after it completes the configuration change. In this case the first node would not be able to synchronize itself with the other nodes. To overcome this problem, in some embodiments the other nodes of the cluster may also keep a copy of the message queue. Thus, if the master node fails then another node in the cluster can transmit the message queue to the first node.

As discussed above, if the first node is the master node then another node may be selected as the master node while the first node is in the inactive state. In various embodiments any of various techniques may be used to select the new master node. In some embodiments each node may have an ID, and the new master node may be selected on the basis of the node IDs. In some embodiments the master node may be selected as the node with the lowest ID. Normally, if a node with a lower ID joins the cluster then the newly joined node may become the master node. However, if the new node joins the cluster while the first node is in the inactive state then the current master node may remain as the master node until the first node returns to the normal state. This is because the newly joined node may not have a copy of all the messages that need to be broadcast to the first node after it completes its configuration change.

In various embodiments, various client software applications may use the services of the cluster of virtual servers. In some embodiments the cluster of virtual servers may implement an application programming interface (API) which notifies the client applications when the first node enters the temporarily inactive state. This enables the client applications to perform any necessary adjustments to compensate for the first node being inactive.

Various embodiments of a method for performing a message broadcast protocol in a cluster of virtual servers have been described above. The method is implemented by the physical nodes 10 of the cluster of virtual servers, and causes transformations to occur in one or more of the nodes 10. For example, nodes of the cluster are transformed by storing status information for the first node indicating that the first node is in the temporarily inactive state, and storing timeout information indicating the altered heartbeat timeout and response timeout for the first node. The master node, and possibly other nodes as well, are also transformed by storing the message queue for the operation messages that need to be transmitted to the first node after the first node completes the configuration change to its virtualization environment.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-accessible storage medium storing program instructions,
    wherein the program instructions are executable by each of a plurality of nodes of a cluster of virtual servers, wherein each node of the cluster of virtual servers executes virtualization software which implements a virtualization environment in which one or more virtual server machines execute;
    wherein the program instructions are executable by one or more processors of a first node of the cluster of virtual servers to:
        register to receive notifications of one or more types of configuration changes in the virtualization environment of the first node, wherein each respective type of configuration change prevents the first node from responding to broadcast messages sent by other nodes of the cluster of virtual servers during the respective type of configuration change;
        after registering to receive the notifications, receive a first notification indicating that a first type of configuration change in the virtualization environment of the first node has been initiated; and
        in response to the first notification, transmit a first message to one or more other nodes of the cluster of virtual servers to inform the one or more other nodes that the first node is in a temporarily inactive state in which the first node is unable to respond to broadcast messages sent by other nodes of the cluster of virtual servers;

wherein, for each respective node of the one or more other nodes, the program instructions are executable by one or more processors of the respective node to store information indicating that the first node is in the temporarily inactive state in response to receiving the first message.

2. The non-transitory computer-accessible storage medium of claim 1,
wherein the program instructions are further executable by the one or more processors of the first node of the cluster of virtual servers to determine a particular amount of time which the first type of configuration change in the virtualization environment of the first node is expected to take to complete;
wherein the first message transmitted to the one or more other nodes of the cluster of virtual servers includes the particular amount of time and informs the one or more other nodes that the first node is expected to be in the temporarily inactive state for the particular amount of time.

3. The non-transitory computer-accessible storage medium of claim 2,
wherein the cluster of virtual servers includes a second node configured to broadcast heartbeat messages to other nodes of the cluster of virtual servers to determine whether the other nodes are currently active;
wherein the program instructions are executable by one or more processors of the second node of the cluster of virtual servers to:
receive the first message indicating that the first node is expected to be in the temporarily inactive state for the particular amount of time; and
increase a heartbeat timeout for the first node from a default value to a new value based on the particular amount of time in response to receiving the first message.

4. The non-transitory computer-accessible storage medium of claim 1,
wherein the program instructions are executable by one or more processors of a second node of the cluster of virtual servers to:
receive the first message indicating that the first node is in the temporarily inactive state;
after receiving the first message, initiate a multi-phase commit protocol by broadcasting a query message to each of the other nodes of the cluster of virtual servers requesting them to reply indicating whether they can commit a particular operation;
receive a reply to the query message from each node of the cluster of virtual servers except the first node affirming ability to commit the particular operation;
in response to determining that the first node is in the temporarily inactive state, determine that the particular operation should be committed by each of the other nodes of the cluster of virtual servers except the first node without waiting for a reply to the query message from the first node; and
broadcast a commit message requesting each of the other nodes of the cluster of virtual servers except the first node to commit the particular operation.

5. The non-transitory computer-accessible storage medium of claim 4,
wherein the program instructions are further executable by the one or more processors of the second node of the cluster of virtual servers to:
set a response timeout for the first node to a particular value in response to receiving the first message indicating that the first node is in the temporarily inactive state;
wherein determining that the particular operation should be committed by each of the other nodes of the cluster of virtual servers except the first node without waiting for a reply to the query message from the first node includes determining that the response timeout for the first node has expired since the query message was broadcast.

6. The non-transitory computer-accessible storage medium of claim 1,
wherein the program instructions are further executable by the one or more processors of the first node of the cluster of virtual servers to:
receive a second notification indicating that the first type of configuration change in the virtualization environment of the first node has been completed; and
transmit an additional message to the one or more other nodes of the cluster of virtual servers to inform the one or more other nodes that the first node has returned to a normal state in which the first node is able to respond to broadcast messages sent by other nodes of the cluster of virtual servers.

7. The non-transitory computer-accessible storage medium of claim 6,
wherein the program instructions are executable by one or more processors of a second node of the cluster of virtual servers to:
receive the additional message transmitted from the first node indicating that the first node has returned to the normal state;
in response to the additional message, determine that one or more operations were committed by each of the nodes of the cluster of virtual servers except the first node while the first node was in the temporarily inactive state; and
transmit one or more messages to the first node requesting the first node to commit the one or more operations.

8. The non-transitory computer-accessible storage medium of claim 1,
wherein receiving the first notification indicating that the first type of configuration change in the virtualization environment of the first node has been initiated includes receiving a notification indicating that a change in one or more resources assigned to the virtualization environment of the first node.

9. The non-transitory computer-accessible storage medium of claim 1,
wherein receiving the first notification indicating that the first type of configuration change in the virtualization environment of the first node has been initiated includes receiving a notification indicating one of:
initiation of migration of a virtual server machine to the virtualization environment of the first node from another node of the cluster of virtual servers;
initiation of migration of a virtual server machine from another node of the cluster of virtual servers to the virtualization environment of the first node.

10. The non-transitory computer-accessible storage medium of claim 1,
wherein receiving the first notification indicating that the first type of configuration change in the virtualization environment of the first node has been initiated includes one or more of:

receiving a notification indicating that a change in one or more virtual network links used by the first node has been initiated;

receiving a notification indicating that a change in one or more virtual network switches used by the first node has been initiated.

11. The non-transitory computer-accessible storage medium of claim 1, wherein the program instructions are executable by the one or more processors of the first node of the cluster of virtual servers to register to receive the notifications of the one or more types of configuration changes in the virtualization environment of the first node by registering with an operating system of the first node to receive the notifications.

12. The non-transitory computer-accessible storage medium of claim 1, wherein the first node is a master node of the cluster of virtual servers;

wherein the program instructions are executable by one or more processors of one or more other nodes of the cluster of virtual servers to:

receive the first message indicating that the first node is in the temporarily inactive state; and select another node of the cluster of virtual servers to replace the first node as the master node of the cluster of virtual servers in response to receiving the first message.

13. A method comprising:

a plurality of nodes communicating to implement a cluster of virtual servers, wherein each node of the cluster of virtual servers executes virtualization software which implements a virtualization environment in which one or more virtual server machines execute;

wherein the plurality of nodes includes a first node, wherein the first node registers to receive notifications of one or more types of configuration changes in the virtualization environment of the first node, wherein each respective type of configuration change prevents the first node from responding to broadcast messages sent by other nodes of the cluster of virtual servers during the respective type of configuration change;

wherein, after registering to receive the notifications, the first node receives a first notification indicating that a first type of configuration change in the virtualization environment of the first node has been initiated;

wherein, in response to the first notification, the first node transmits a first message to one or more other nodes of the cluster of virtual servers to inform the one or more other nodes that the first node is in a temporarily inactive state in which the first node is unable to respond to broadcast messages sent by other nodes of the cluster of virtual servers; and wherein the one or more other nodes of the cluster of virtual servers store information indicating that the first node is in the temporarily inactive state in response to receiving the first message.

14. The method of claim 13, further comprising:

the first node of the cluster of virtual servers determining a particular amount of time which the first type of configuration change in the virtualization environment of the first node is expected to take to complete;

wherein the first message transmitted to the one or more other nodes of the cluster of virtual servers includes the particular amount of time and informs the one or more other nodes that the first node is expected to be in the temporarily inactive state for the particular amount of time.

15. The method of claim 14, further comprising:

a second node of the cluster of virtual servers broadcasting heartbeat messages to other nodes of the cluster of virtual servers to determine whether the other nodes are currently active;

the second node receiving the first message indicating that the first node is expected to be in the temporarily inactive state for the particular amount of time; and the second node increasing a heartbeat timeout for the first node from a default value to a new value based on the particular amount of time in response to receiving the first message.

16. The method of claim 13, further comprising:

a second node of the cluster of virtual servers receiving the first message indicating that the first node is in the temporarily inactive state;

after receiving the first message, the second node initiating a multi-phase commit protocol by broadcasting a query message to each of the other nodes of the cluster of virtual servers requesting them to reply indicating whether they can commit a particular operation;

the second node receiving a reply to the query message from each node of the cluster of virtual servers except the first node affirming ability to commit the particular operation;

in response to determining that the first node is in the temporarily inactive state, the second node determining that the particular operation should be committed by each of the other nodes of the cluster of virtual servers except the first node without waiting for a reply to the query message from the first node; and the second node broadcasting a commit message requesting each of the other nodes of the cluster of virtual servers except the first node to commit the particular operation.

17. A system comprising:

a plurality of nodes of a cluster of virtual servers, wherein each node of the cluster of virtual servers is configured to execute virtualization software which implements a virtualization environment in which one or more virtual server machines execute;

wherein a first node of the cluster of virtual servers is configured to:

register to receive notifications of one or more types of configuration changes in the virtualization environment of the first node, wherein each respective type of configuration change prevents the first node from responding to broadcast messages sent by other nodes of the cluster of virtual servers during the respective type of configuration change;

after registering to receive the notifications, receive a first notification indicating that a first type of configuration change in the virtualization environment of the first node has been initiated; and in response to the first notification, transmit a first message to one or more other nodes of the cluster of virtual servers to inform the one or more other nodes that the first node is in a temporarily inactive state in which the first node is unable to respond to broadcast messages sent by other nodes of the cluster of virtual servers;

wherein one or more other nodes of the cluster of virtual servers are configured to store information indicating that the first node is in the temporarily inactive state in response to receiving the first message.

18. The system of claim 17, wherein the first node of the cluster of virtual servers is further configured to determine a particular amount of time which the first type of configuration change in the virtualization environment of the first node is expected to take to complete, and wherein the first message transmitted to the one or more other nodes of the cluster of virtual servers includes the particular amount of time and informs the one or more other nodes that the first node is expected to be in the temporarily inactive state for the particular amount of time.

19. The system of claim 18, further comprising:
a second node of the cluster of virtual servers configured to broadcast heartbeat messages to other nodes of the cluster of virtual servers to determine whether the other nodes are currently active;
wherein the second node is further configured to receive the first message indicating that the first node is expected to be in the temporarily inactive state for the particular amount of time; and
wherein the second node further configured to increase a heartbeat timeout for the first node from a default value to a new value based on the particular amount of time in response to receiving the first message.

20. The method of claim 17, further comprising:
a second node of the cluster of virtual servers configured to receive the first message indicating that the first node is in the temporarily inactive state;
wherein after receiving the first message, the second node is further configured to initiate a multi-phase commit protocol by broadcasting a query message to each of the other nodes of the cluster of virtual servers requesting them to reply indicating whether they can commit a particular operation;
wherein the second node is further configured to receive a reply to the query message from each node of the cluster of virtual servers except the first node affirming ability to commit the particular operation;
wherein in response to determining that the first node is in the temporarily inactive state, the second node is further configured to determine that the particular operation should be committed by each of the other nodes of the cluster of virtual servers except the first node without waiting for a reply to the query message from the first node; and
wherein the second node is further configured to broadcast a commit message requesting each of the other nodes of the cluster of virtual servers except the first node to commit the particular operation.

* * * * *